(12) United States Patent
Hung

(10) Patent No.: US 8,474,099 B2
(45) Date of Patent: Jul. 2, 2013

(54) HINGE ASSEMBLY

(75) Inventor: Pei-Yu Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 29 days.

(21) Appl. No.: 13/206,529

(22) Filed: Aug. 10, 2011

(65) Prior Publication Data

US 2013/0007985 A1    Jan. 10, 2013

(30) Foreign Application Priority Data

Jul. 7, 2011   (TW) .............................. 100212466 U

(51) Int. Cl.
*E05D 7/10* (2006.01)

(52) U.S. Cl.
USPC .................. 16/267; 16/257; 16/254; 16/260; 16/387

(58) Field of Classification Search
USPC ................... 16/342, 254, 255, 260, 387, 388, 16/278, 286, 297, 324, 335, 349, 257, 267
See application file for complete search history.

(56) References Cited

U.S. PATENT DOCUMENTS

| | | | |
|---|---|---|---|
| 470,291 A * | 3/1892 | Dowling | 16/260 |
| 760,890 A * | 5/1904 | Mackinder | 16/296 |
| 1,166,551 A * | 1/1916 | Simmons | 16/342 |
| 1,528,599 A * | 3/1925 | Belville | 16/260 |
| 1,901,072 A * | 3/1933 | Aldeen | 16/267 |
| 2,578,612 A * | 12/1951 | Stregack | 150/120 |
| 2,722,034 A * | 11/1955 | May | 16/268 |
| 2,872,697 A * | 2/1959 | Hizsa, Jr | 16/342 |
| 4,193,165 A * | 3/1980 | Malacheski et al. | 16/335 |
| 4,223,421 A * | 9/1980 | Wassenaar | 16/267 |
| 4,237,577 A * | 12/1980 | Chapel | 16/262 |
| 4,345,697 A * | 8/1982 | Wilson et al. | 220/831 |
| 4,372,007 A * | 2/1983 | Lee | 16/260 |
| 4,688,305 A * | 8/1987 | MacKirdy | 27/16 |
| 5,359,587 A * | 10/1994 | Uehara | 720/600 |
| 5,456,790 A * | 10/1995 | Yu Chen | 156/527 |
| 5,898,976 A * | 5/1999 | Leonardi et al. | 16/278 |
| 6,834,416 B2 * | 12/2004 | Wang et al. | 16/266 |
| 2004/0111837 A1 * | 6/2004 | Lallemant | 16/297 |

* cited by examiner

*Primary Examiner* — Victor Batson
*Assistant Examiner* — Emily Morgan
(74) *Attorney, Agent, or Firm* — Altis Law Group, Inc.

(57) ABSTRACT

A hinge assembly includes a first body, and a second body capable of rotating relatively to the first body. The first body includes a first main part and a pair of stopper portions respectively extending from two sides of the first main part and coplanar with the first main part. Two ends of a shaft are fixed with the pair of stopper portions, respectively. The second body includes a second main part, a pair of blocking portions and a resilient arm located between the pair of the blocking portions. When the second body rotates to be perpendicular to the first body, the second body is positioned stably relative to the first body without an external force, due to an elasticity of the resilient arm of the second body.

9 Claims, 5 Drawing Sheets

HINGE ASSEMBLY

BACKGROUND

1. Technical Field

The present disclosure generally relates to hinge assemblies.

2. Description of Related Art

Portable electronic devices, such as mobile phones, generally employ hinges in order to rotate or swivel parts of the electronic devices. However, because these hinges are typically bought from a third-party company, the electronic devices must be matched with the hinges, which leads to a high cost and a complex structure.

Therefore, a need exists in the industry to overcome the described problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
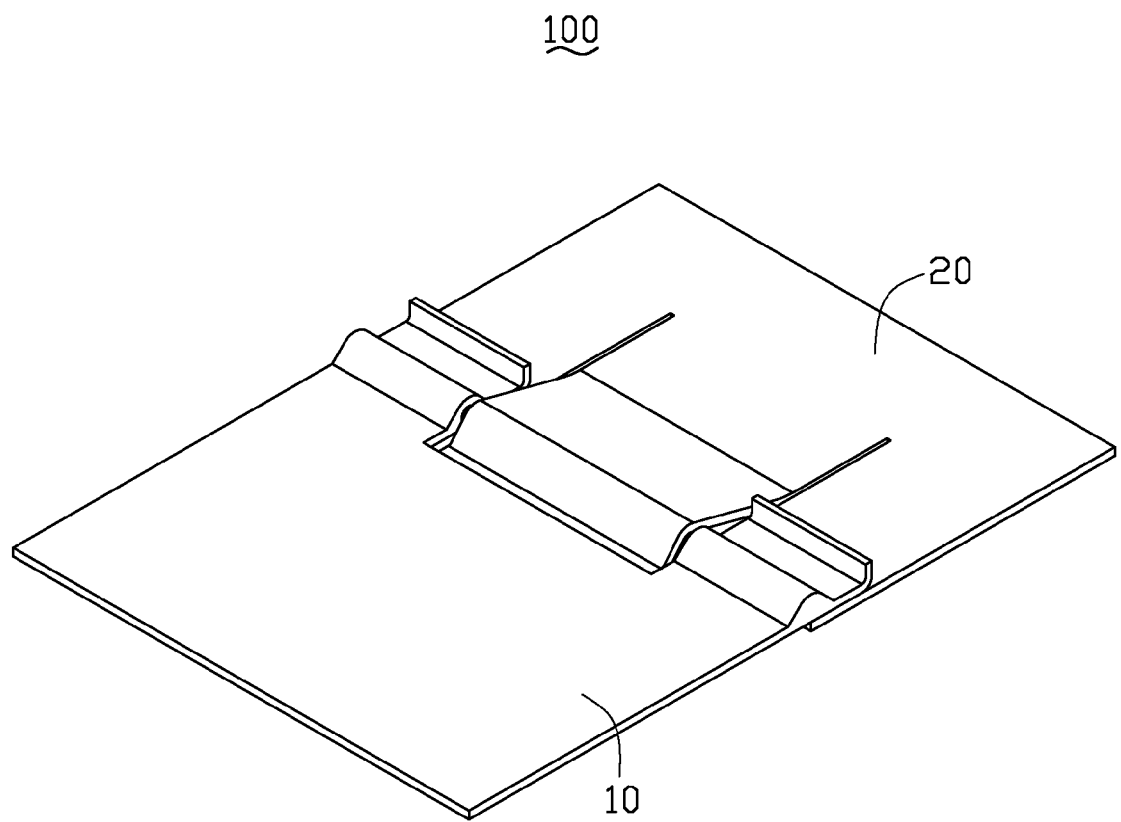
FIG. 1 is a perspective view of a hinge assembly with an exemplary embodiment of the disclosure.
Figure 2:
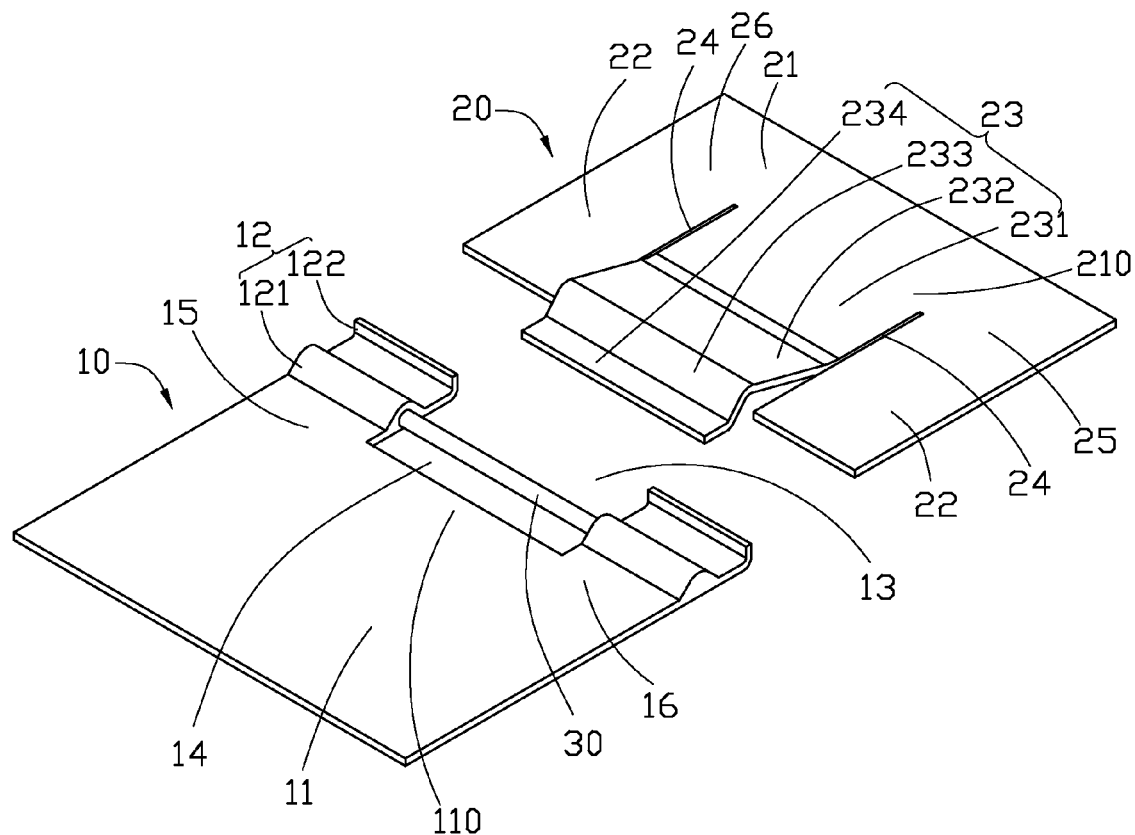
FIG. 2 is a disassembled perspective view of the hinge assembly shown in FIG. 1.

With reference to FIG. 1 and FIG. 2, a hinge assembly 100 comprises a first body 10, and a second body 20 capable of rotating relative to the first body 10. The first body 10 comprises a first main part 11 and a pair of stopper portions 12 respectively extending from two opposite ends 15, 16 of one edge 110 of the first main part 11 and coplanar with the first main part 11. The first main part 11 and the pair of stopper portions 12 collectively define an opening 13. A shaft 30 is disposed in the opening 13 with two ends of the shaft 30 respectively fixed with the pair of stopper portions 12. As a result, the shaft 30, the first main part 11 and the pair of stopper portions 12 collectively define a receiving hole 14.

The second body 20 comprises a second main part 21, a pair of blocking portions 22 respectively extending from two opposite ends 25, 26 of one edge 210 of the second main part 21 and coplanar with the second main part 21, and a resilient arm 23 extending from the second main part 21 and located between the pair of blocking portions 22. The resilient arm 23 comprises a first extending portion 231 extending from the second main part 21 and coplanar with the pair of blocking portions 22, a second extending portion 232 curvedly extending from the first extending portion 231 and away from the pair of the blocking portions 22, a third extending portion 233 curvedly extending from the second extending portion 232 and toward the pair of the blocking portions 22, and an abutting end 234 extending from the third extending portion 233 and coplanar with the pair of the blocking portions 22. By this structure, a junction portion between the second extending portion 232 and the third extending portion 233 is configured as a ridge portion 235, as shown in FIG. 3.

In the embodiment, the second body 20 is made of materials adapted to be bent easily, such as copper. The resilient arm 23 is formed by punching the second body 20 and bending the punched second body 20. During a punching process, a pair of gaps 24 are configured between the blocking portions 22 and the resilient arm 23 to enhance elasticity of the resilient arm 23. Alternatively, the second body 20 can be made of plastic materials, and the resilient arm 23 is formed by a molding process.

In the embodiment, each stopper portion 12 comprises a positioning portion 121 extending from a corresponding side of the first main part 11 and coplanar with the first main part 11, and an abutting portion 122 perpendicularly extending from a distal end 1211 of the positioning portion 121. The two ends of the shaft 30 are fixed with the pair of positioning portions 121, respectively. When the second body 20 rotates to be perpendicular to the first body 10, the abutting portions 122 of the first body 10 perpendicularly abut against the blocking portions 22 of the second body 20, respectively.

Figure 3:
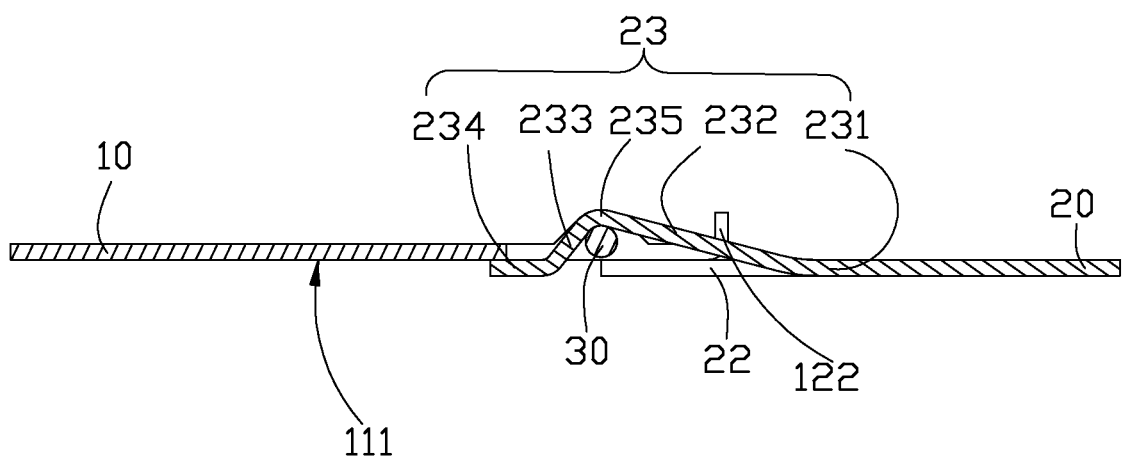
FIG. 3 is a sectional view of the hinge assembly shown in FIG. 1.

With reference to FIG. 3, during assembly of the hinge assembly 100, the abutting end 234 of the resilient arm 23 of the second body 20 extends into the receiving hole 14 of the first body 10, and abuts against a bottom 111 of the first main part 11 of the first body 10. By this way, the stopper portions 12 of the first body 10 urge the blocking portions 22 of the second body 20, respectively. The shaft 30 resists on the ridge portion 235 of the resilient arm 23.

Figure 4:
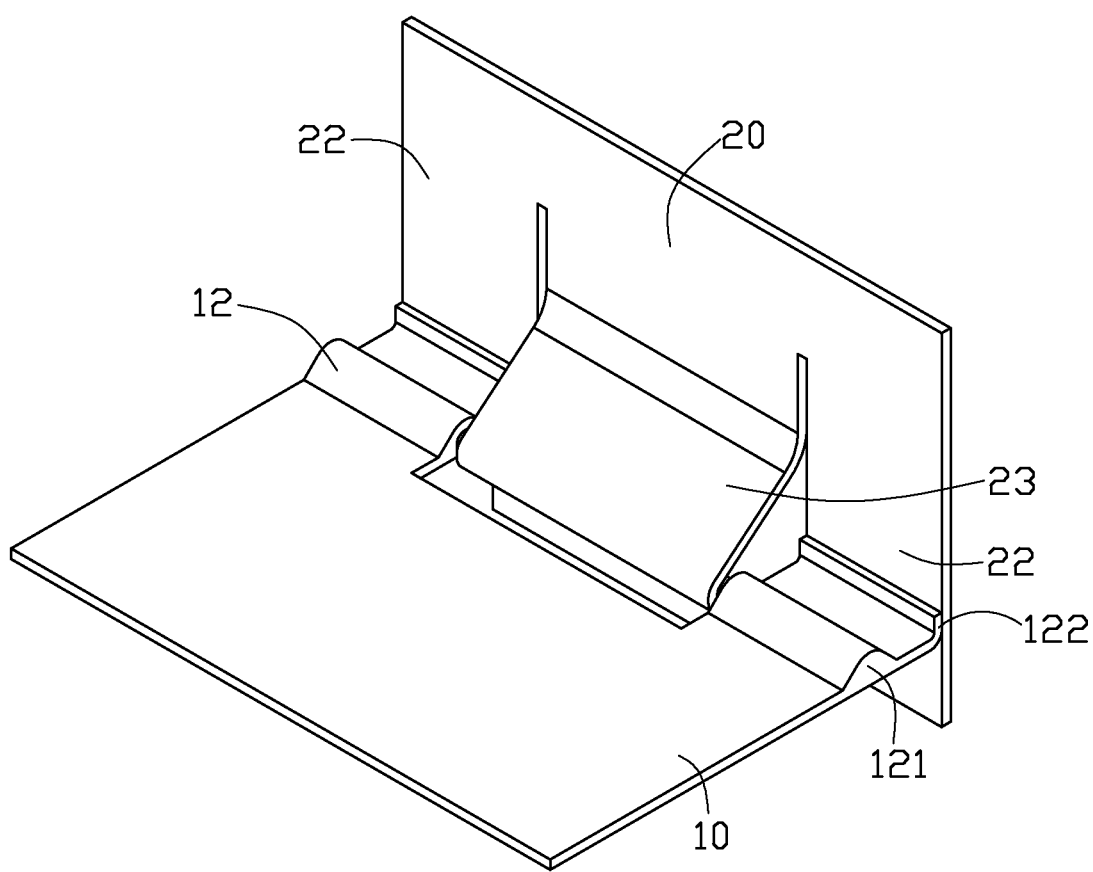
FIG. 4 is a perspective view of the hinge assembly, showing the hinge assembly rotating with a position of a second body of the hinge assembly perpendicular to a first body of the hinge assembly.
Figure 5:
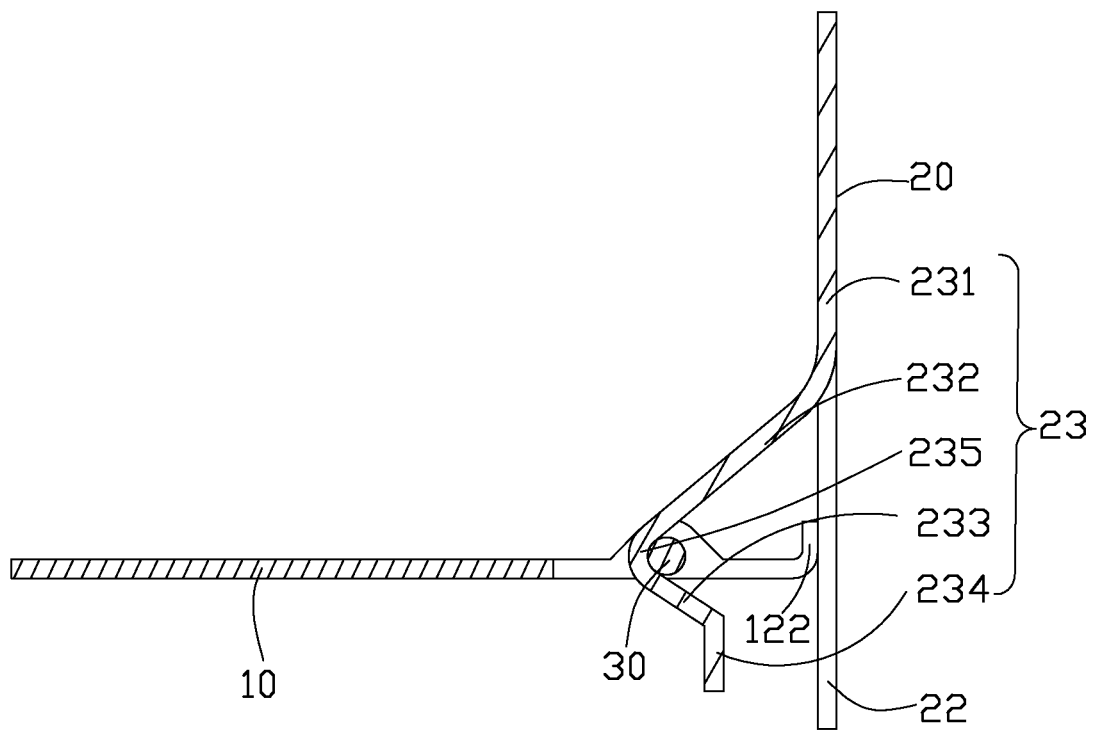
FIG. 5 is a sectional view of the hinge assembly shown in FIG. 4.

With reference to FIG. 4 and FIG. 5, when the second body 20 rotates relatively to the first body 10, the ridge portion 235 of the resilient arm 23 rotates around the shaft 30 by an external force. Subsequently, the abutting end 234 of the resilient arm 23 moves away from the first main part 11 of the first body 10, and the stopper portions 12 of the first body 10 slides on the blocking portions 22 of the second body 20. In other words, a moment (tendency of a force to twist or rotate an object) during rotation of the second body 20 relative to the first body 10 is produced due to the elastic deformation of the first extending portion 231 of the resilient arm 23 relative to the second extending portion 232 of the resilient arm 23. At the same time, the moment produces a first force applied to the stopper portions 12 of the first body 10 on the abutting portions 122. However, because the stopper portions 12 of the first body 10 fail to overcome the first force completely, application of the external force on the second body 20 is needed to overcome the first force to ensure that the second body 20 is capable of rotating relative to the first body 10.

When the second body 20 rotates to be perpendicular to the first body 10, the stopper portions 12 of the first body 10 perpendicularly resist the blocking portions 22 of the second body 20, respectively. By this way, the stopper portions 12 of the first body 10 are able to completely overcome the first force as described above. That is, the moment produces the first force applied to the stopper portion 12 of the first body 10 on the abutting portion 122 has a same size and an opposite direction as that of a second force that the stopper portions 12 of the first body 10 applies to the blocking portions 22 of the second body 20. As a result, when the second body 20 is perpendicular to the first body 10, the second body 20 is capable of positioning stably without the external force.

In the embodiment, during the second body 20 rotating relatively to the first body 10, the ridge portion 235 always keeps contacting with the shaft 30, and the stopper portions 12 of the first body 10 always keep contacting with the blocking portions 22 of the second body 20 due to the elasticity of the resilient arm 23, which leads to a stable connection relationship between the first body 10 and the second body 20.

The hinge assembly 100 of the disclosure is capable of rotating just by the elasticity of the resilient arm 23, and an electronic device is capable of rotating a part of the electronic device with employment of the hinge assembly 100, which leads to simplification of design of the electronic device. Furthermore, the electronic device employed the hinge assembly 100 can rotate or swivel the part of the electronic device without using standard hinges from third-party company, which leads to low cost.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A hinge assembly, comprising:
a first body comprising a first main part, a pair of stopper portions extending from two opposite ends of one edge of the first main part and coplanar with the first main part, respectively, and a shaft fixed between the pair of stopper portions to collectively define an receiving hole with the pair of stopper portions and the first main part; and
a second body comprising a second main part, a pair of blocking portions respectively extending from two opposite ends of one edge of the second main part and coplanar with the second main part, and a resilient arm extending from the second main part and located between the pair of blocking portions, wherein the resilient arm comprises a first extending portion extending from the second main part and coplanar with the pair of blocking portions, a second extending portion extending slantwise and upwardly from the first extending portion, a third extending portion extending slantwise and downwardly from the second extending portion, and an abutting end extending from the third extending portion and coplanar with the blocking portions, and wherein a ridge portion is formed between the third extending portion and the second extending portion;
wherein the abutting end extends into the receiving hole of the first body and abuts against the first main part, the pair of stopper portions of the first body contact the pair of the blocking portions of the second body, respectively, and the ridge portion is capable of rotating around the shaft by an external force.

2. The hinge assembly as claimed in claim 1, wherein the pair of stopper portions and the first main part collectively define an opening, and the shaft is disposed in the opening.

3. The hinge assembly as claimed in claim 1, wherein a pair of gaps are configured between the pair of blocking portions and the resilient arm.

4. The hinge assembly as claimed in claim 1, wherein each of the pair of stopper portions comprises a positioning portion extending from a corresponding side of the first main part, and an abutting portion perpendicularly extending from a distal end of the positioning portion, wherein the shaft is connected between the pair of positioning portions, and when the second body rotates to be perpendicular to the first body, the abutting portions perpendicularly abut against the blocking portions of the second body, respectively.

5. A hinge assembly, comprising:
a first body comprising a first main part, and a pair of stopper portions extending from the first main part, each of the pair of stopper portions comprising a positioning portion extending from a corresponding side of the first main part, and an abutting portion perpendicularly extending from a distal end of the positioning portion, wherein a shaft is connected between the pair of positioning portions; and
a second body comprising a second main part, a pair of blocking portions respectively extending from two opposite ends of one edge of the second main part and coplanar with the second main part, and a resilient arm located between the pair of blocking portions;
wherein the resilient arm extends toward the first body and contacts the shaft, the pair of stopper portions of the first body contact the pair of the blocking portions of the second body, respectively, and the resilient arm is configured to rotate around the shaft by an external force, and wherein when the second body rotates to be perpendicular to the first body, the abutting portions perpendicularly abut against the blocking portions of the second body, respectively.

6. The hinge assembly as claimed as claim 5, wherein the pair of stopper portions extend from two opposite ends of one edge of the first main part and are coplanar with the first main part, respectively, and wherein the first main part, the pair of stopper portions and the shaft collectively define an receiving hole into which the resilient arm extends.

7. The hinge assembly as claimed in claim 6, wherein the pair of stopper portions and the first main part collectively define an opening, and the shaft is disposed in the opening.

8. The hinge assembly as claimed in claim 5, wherein a pair of gaps are configured between the pair of blocking portions and the resilient arm.

9. The hinge assembly as claimed as claim 5, wherein the resilient arm comprises a first extending portion extending from the second main part and coplanar with the pair of blocking portions, a second extending portion extending slantwise and upwardly from the first extending portion and away from the pair of blocking portions, a third extending portion extending slantwise and downwardly from the second extending portion and toward the pair of blocking portions, and an abutting end extending from the third extending portion and coplanar with the blocking portions, wherein a ridge portion is formed between the third extending portion and the second extending portion, the abutting end extends into the receiving hole, and the ridge portion contacts resists the shaft and is configured to rotate around the shaft.

* * * * *